(12) United States Patent
Feng et al.

(10) Patent No.: US 10,504,039 B2
(45) Date of Patent: Dec. 10, 2019

(54) SHORT MESSAGE CLASSIFICATION FOR VIDEO DELIVERY SERVICE AND NORMALIZATION

(71) Applicant: HULU, LLC, Santa Monica, CA (US)

(72) Inventors: Wei Feng, Beijing (CN); Tao Xiong, Beijing (CN); Di Wu, Beijing (CN); Zhibing Wang, Beijing (CN); Wei Wang, Beijing (CN)

(73) Assignee: HULU, LLC., Santa Monica, CA (US)

( * ) Notice: Subject to any disclaimer, the term of this patent is extended or adjusted under 35 U.S.C. 154(b) by 827 days.

(21) Appl. No.: 15/147,778

(22) Filed: May 5, 2016

(65) Prior Publication Data

US 2017/0323016 A1    Nov. 9, 2017

(51) Int. Cl.
*G06N 20/00* (2019.01)
*G06F 16/78* (2019.01)

(52) U.S. Cl.
CPC ......... *G06N 20/00* (2019.01); *G06F 16/7867* (2019.01)

(58) Field of Classification Search
CPC .. G06N 20/00; G06N 99/005; G06F 16/7867; G06F 17/30828; G06F 17/3082
USPC ........................................................ 706/12
See application file for complete search history.

(56) References Cited

U.S. PATENT DOCUMENTS

| 9,098,807 | B1 * | 8/2015 | Samaniego | ........ G06Q 30/0201 |
| 2012/0246097 | A1 * | 9/2012 | Jain | ......................... G06F 16/35 706/12 |
| 2014/0358929 | A1 * | 12/2014 | Bailey | ..................... G06F 16/95 707/738 |
| 2017/0185583 | A1 * | 6/2017 | Pino | ..................... G06F 17/2735 |
| 2017/0193075 | A1 * | 7/2017 | Hegelich | ................. H04L 51/16 |

OTHER PUBLICATIONS

Shuang Yang, Alek Kolcz, Andy Schlaikjer, Pankaj Gupta, "Large-Scale High-Precision Topic Modeling on Twitter," KDD '14, Aug. 24-27, 2014, ACM 978-1-4503-2959-9/14/08.

Kevin Gimpel, Nathan Schneider, Brendan O'Connor, Dipanjan Das, Daniel Mills, Jacob Eisenstein, Michael Heilman, Dani Yogatama, Jeffrey Flanigan, and Noah A. Smith, "Part-of-Speech Tagging for Twitter: Annotation, Features, and Experiments". Published in Meeting of the Association for Computational Linguistics, 2011.

Wang Ling, Guang Xiang, Chris Dyer, Alan Black, and Isabel Trancoso, "Microblogs as Parallel Corpora," Published in Meeting of the Association for Computational Linguistics, 2013.

(Continued)

*Primary Examiner* — Dave Misir
(74) *Attorney, Agent, or Firm* — Fountainhead Law Group

(57) ABSTRACT

In one embodiment, a method selects a set of accounts related to a video using a first classifier that is trained to identify the set of accounts from a plurality of accounts and selects a token used to identify the video. A second classifier is trained to identify short messages that are related to the video using a first set of short messages from the accounts related to the video and the second set of short messages including the tokens. A third set of short messages is identified that is related to the video from a plurality of short messages. The method normalizes words in the set of short messages using a mixed model including a lexicon model and a translation model. Then, the method generates a set of ratings for the set of short messages and uses the set of ratings in a service for a video delivery service.

20 Claims, 11 Drawing Sheets

(56) References Cited

OTHER PUBLICATIONS

Internet article entitled—"scikit-learn, Maching Learning in Python." scikit-learn0.17.1 documentation, retrieved from: http://scikit-learn.org/stable/. Printed Apr. 27, 2016.

Joshua Roesslein, tweepy Documentation, Release 3.6.0. Published Mar. 3, 2016; retrieved from https://media.readthedocs.org/pdf/tweepy/latest/tweepy.pdf.

Internet article entitled "3.2.4.3.1. sklearn.esemble.RandomForestClassifier", retrieved from http://scikit-earn.org/stable/modules/generated/sklearn.ensemble.RandomForestClassifer.html. Printed Apr. 27, 2016.

Thorsten Joachims, Cornell University, article entitled "SVM Light—Support Vector Machine", Version 6.02, Dated Aug. 14, 2008.

\* cited by examiner

US 10,504,039 B2

SHORT MESSAGE CLASSIFICATION FOR VIDEO DELIVERY SERVICE AND NORMALIZATION

BACKGROUND

In a video delivery service, knowing which videos are popular or are trending is important. The popularity can be used in many different services offered by the video delivery service. For example, a popular video may be recommended to a user. Also, the user interface may display videos that are trending. This may increase the user interaction with the video delivery service. Further, business analysis tools may use which videos are popular in their analysis.

There are many different sources the video delivery service can use to determine the popularity. In some cases, sources offer services that allow users to generate short messages. For example, user's may send short messages about a show's episode or a movie. The short messages from sources can be used to determine an indication of a video's popularity. However, users using the short messages may not provide clear information on whether the short message is about the show or not. Thus, if the video delivery service decides to use short messages, care must be taken as to the accuracy of the content of the short messages.

SUMMARY

In one embodiment, a method selects a set of accounts related to a video using a first classifier that is trained to identify the set of accounts from a plurality of accounts and selects a token used to identify the video. A second classifier is trained to identify short messages that are related to the video using a first set of short messages from the accounts related to the video and the second set of short messages including the tokens, wherein at least a portion of the first set of short messages and a second set of short messages have a length restriction. A third set of short messages is identified that is related to the video from a plurality of short messages, the plurality of short message being generated from a search for the video. The method normalizes words in the set of short messages using a mixed model including a lexicon model and a translation model. Then, the method generates a set of ratings for the set of short messages for the video and uses the set of ratings in a service for a video delivery service.

In one embodiment, a non-transitory computer-readable storage medium contains instructions, that when executed, control a computer system to be configured for: selecting a set of accounts related to a video using a first classifier that is trained to identify the set of accounts from a plurality of accounts; selecting a token used to identify the video; training a second classifier to identify short messages that are related to the video using a first set of short messages from the accounts related to the video and the second set of short messages including the tokens, wherein at least a portion of the first set of short messages and a second set of short messages have a length restriction; identifying a third set of short messages that is related to the video from a plurality of short messages, the plurality of short message generated from a search for the video; normalizing words in the set of short messages using a mixed model including a lexicon model and a translation model; generating a set of ratings for the set of short messages for the video; and using the set of ratings in a service for a video delivery service.

In one embodiment, an apparatus includes: one or more computer processors; and a non-transitory computer-readable storage medium comprising instructions, that when executed, control the one or more computer processors to be configured for: selecting a set of accounts related to a video using a first classifier that is trained to identify the set of accounts from a plurality of accounts; selecting a token used to identify the video; training a second classifier to identify short messages that are related to the video using a first set of short messages from the accounts related to the video and the second set of short messages including the tokens, wherein at least a portion of the first set of short messages and a second set of short messages have a length restriction; identifying a third set of short messages that are related to the video from a plurality of short messages, the plurality of short message generated from a search for the video; normalizing words in the set of short messages using a mixed model including a lexicon model and a translation model; generating a set of ratings for the set of short messages for the video; and using the set of ratings in a service for a video delivery service.

The following detailed description and accompanying drawings provide a better understanding of the nature and advantages of particular embodiments.

DETAILED DESCRIPTION

Described herein are techniques for a short message processing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments process short messages from a short message source to determine a rating for videos provided by the video delivery service. Before a rating can be generated, the video delivery service processes the short messages to determine if the short messages are related to a show, and then analyzes the text of the related short messages to determine if any text needs to be normalized. The normalization may normalize some of the text in the short messages such that an subsequent analysis of the short messages conforms to a standard form and is more accurate. Then, a sentiment analysis detection is performed on the short messages to determine a rating for the videos. For example, the rating may indicate a sentiment for the video, such as the short message was positive or negative regarding the video. After determining the rating, the video delivery service may use the ratings in various services, such as to provide recommendations or to generate user interfaces with popular or trending videos.

System Overview

Figure 1:
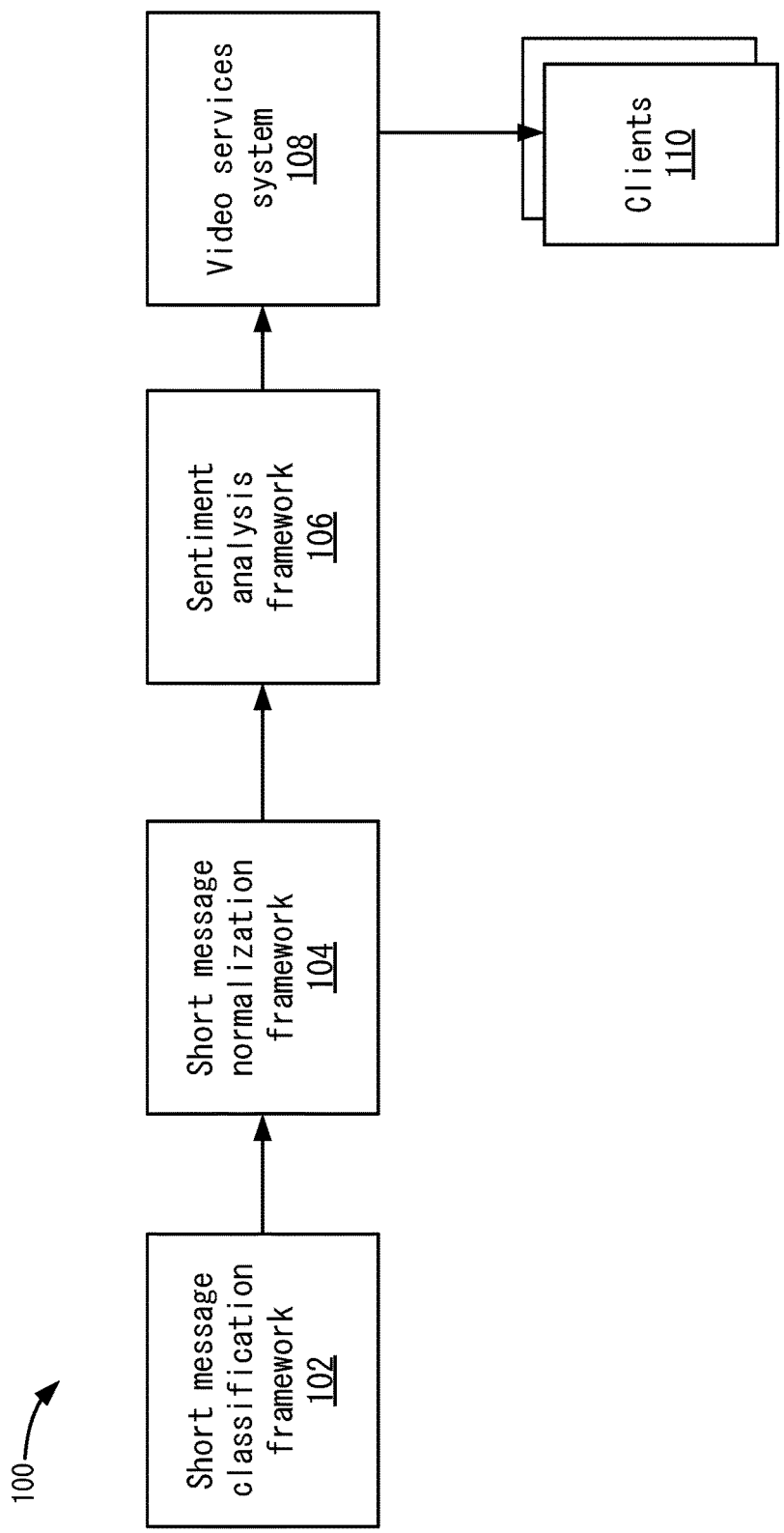
FIG. 1 depicts a simplified system for analyzing short messages according to one embodiment.

FIG. 1 depicts a simplified system 100 for analyzing short messages according to one embodiment. System 100 includes a short message classification framework 102, a short message normalization framework 104, a sentiment analysis framework 106, and a video services system 108 according to one embodiment. System 100 may be used in conjunction with a video delivery service. For example, the video delivery service may offer a number of videos, such as movies and shows, to users on-demand. Users may subscribe to the video delivery service to request the videos on-demand. As discussed above, it is important for the video delivery service to know which videos are popular. A rating may rate the sentiment found in short messages for the videos. Using the rating, the video delivery service can provide recommendations or build a user interface that may include a tray having popular videos. In one example, the video delivery service may release episodes of shows periodically (daily, weekly, etc.). This is different from a single release, such as when a movie is released or all episodes of a show are released at once, because the single release typically experiences a ramp in popularity at the beginning of the release and then the popularity decays. For shows with episodes, multiple releases occur that may have varying popularity and it is important for the video delivery service to analyze the popularity. However, the popularity of movies can also be analyzed similarly.

Short message classification framework 102 may analyze short messages to determine which messages are related to videos offered by the video delivery service. The short messages may come from a single source or multiple sources. Further, the sources may only allow short messages, or may be a service where short messages are used in addition to other content. For example, one source may have a character restriction on all messages. Other sources may allow status updates that are typically short (e.g., below a threshold), but are not limited in characters, but also allow other types of posts (e.g., picture posts). In one embodiment, the source may have a strict limit on short messages; however, particular embodiments are not limited to analyzing messages with the strict limit. In one example, short message classification framework 102 may target certain sources and the messages generated from those sources. In other embodiments, short message classification framework 102 may use a threshold to determine whether messages are short messages.

Short message classification framework 102 can receive short messages and analyze whether the short messages are related to any of the videos for the video delivery service. Short message classification framework 102 may have to parse through a large amount of noisy data when determining whether a short message is related to a video. For example, a short message with the text "24 Hours" could be ambiguous. In one example, the short message may be about the television show "24 Hours." However, in another example, the short message may also state "for the next 24 hours, I will not be sleeping", which does not refer to the television show "24 Hours." A human user might be able to look at the message and classify the second message as not being about the show. However, this is a labor intensive and time consuming method. Particular embodiments automatically classify the messages. However, automatically classifying the short messages may also be hard and not accurate. To improve the classification process, short message classification framework 102 may train a short message classifier to identify video-related short messages automatically. As will be described in more detail below, the classifier can use keywords to extend the classification. Further, the classifier may use domain knowledge from the video delivery service in its analysis to identify short messages that are related to videos. For example, the domain knowledge may identify video-related accounts and video-related tokens to improve the classification and training. In one example, during training process, the classifier uses popular videos from the video delivery service as the initial set of videos. To evaluate the classifier, short message classification framework 102 compares social popularity with the classifier's performance using the popular videos from the video delivery service. If the popularities differ significantly, that may mean the classifier may have mistakenly included some common keyword derived from certain video. Short message classification framework 102 may then remove the noisy video and re-train the classifier. This process will be described in more detail below.

Once short message classification framework 102 determines the short messages that are related to videos, short message normalization framework 104 may normalize the text of at least some of the short messages that are related to the videos. Short message normalization framework 104 may not normalize the short messages that are not related to any videos, which saves time and may increase accuracy. Due to the size restriction for some short messages, such as some services limit short messages to N characters, the language (e.g., text) used in the short messages may include non-standard words or out-of-vocabulary words. The out-of-vocabulary words may be abbreviations ("omg", "lol"), slang, misspellings, etc. Also, other text may include emoticons or tokens that express some entity, such as a hashtag, "#", or at symbol, "@". To properly analyze the short messages and rate them with the same conformity, particular embodiments normalize the text first. This may allow the video delivery service to generate more accurate ratings for the short messages. Short message normalization framework 104 may use a mixed model to perform the normalization that combines a lexicon model and a translation model. This mixed model approach will be described in more detail below.

After determining which short messages are related to videos and then normalizing the text, sentiment analysis framework 106 may generate ratings for the short messages. This may capture the sentiment of the short messages. The ratings can determine the context of the short messages, such as if the content of the short message is positive, which may indicate the video is trending popular, or negative, which may indicate the video is trending unpopular.

Once the ratings of the short messages are determined and aggregated, video services system 108 may perform services using the ratings. For example, popular videos may be recommended to users via clients 110, which may be mobile devices, living room devices, computers, etc. Further, user interfaces on clients 110, such as interfaces that include a trending tray, may include the trending videos that have high positive ratings.

Short Message Classification

Figure 2:
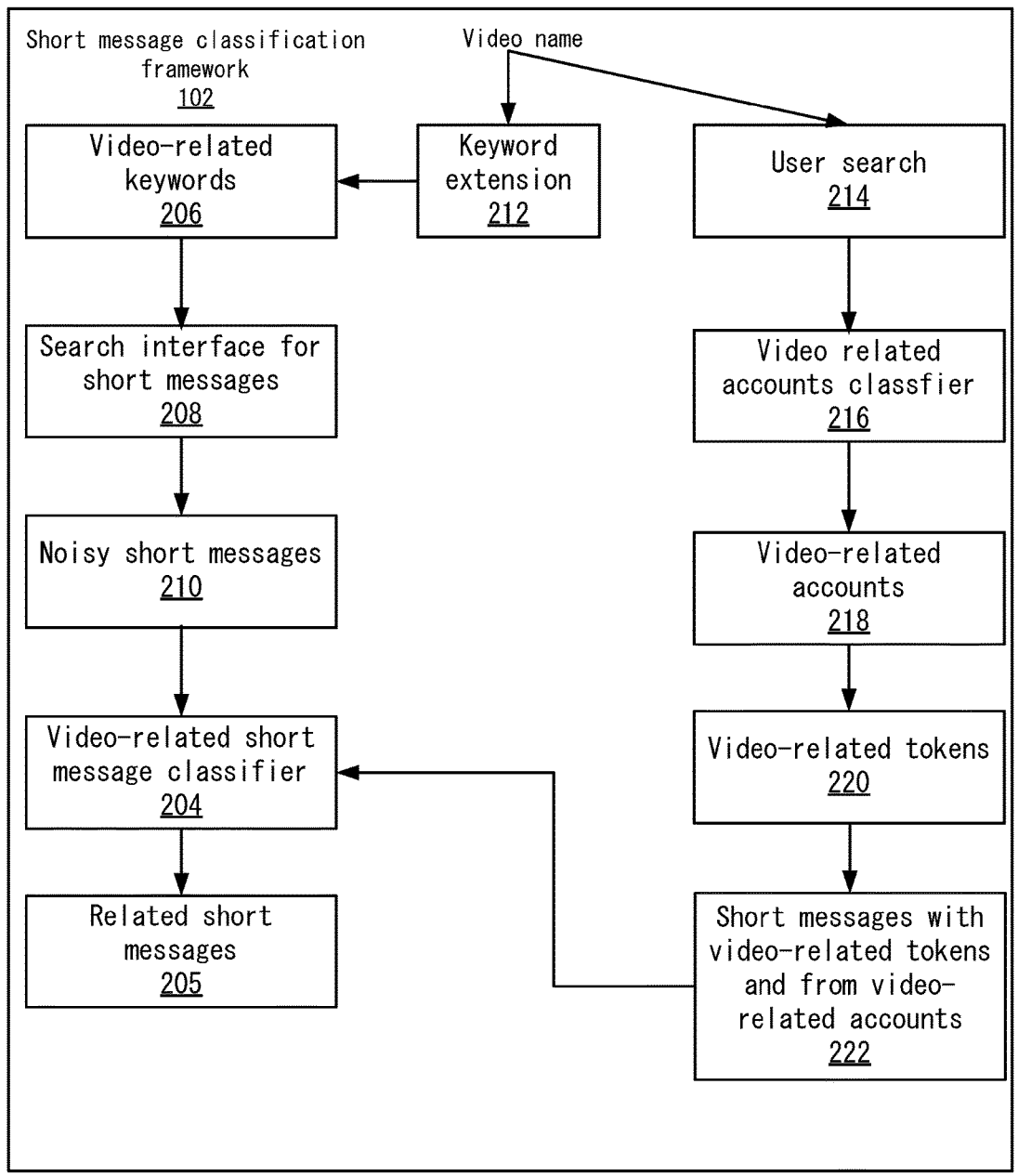
FIG. 2 depicts an example of short message classification framework with an example according to one embodiment.

FIG. 2 depicts an example of short message classification framework 102 with an example 202 according to one embodiment. In short message classification framework 102, a video-related message classifier 204 is used to classify short messages. The classification may determine whether or not short messages are related to videos offered by the video delivery service.

At 208, short message classification framework 102 may search an interface, such as an application programming interface (API), that can search for short messages from a source. In one embodiment, this interface may be provided by the source of the short messages. The show related keywords can be input into the API to generate search results. The search results may be short messages that are returned based on a search algorithm of the short message source. These search results may be considered noisy short messages at 210. The noisy data may include short messages that are not related to the video and also some short messages that are related to the video. The noisy short messages may be input into video-related message classifier 204 where video-related message classifier 204 outputs short messages that are related to the video at 205. Video-related message classifier 204 can be trained to generally classify short messages for a video. However, particular embodiments specially train video-related message classifier 204 to classify short messages based on domain knowledge related to the video delivery service.

Particular embodiments may incorporate domain knowledge from the video delivery service in the classification of the short messages. The use of the domain knowledge finds short messages that are related to a video by adding to a flow with steps that train a classifier to find related videos from a video delivery service. At 206, short message classification framework 102 generates video-related keywords. The video-related keywords may be words that are associated with a video, such as the words may be a title of the video. The title is helpful, but short message classification framework 102 uses a keyword extension algorithm at 212 to generate an extension of the keywords. The keyword extension algorithm can find other video-related keywords, such as the main character's name in the video. This may allow short messages without the video's title to also be tracked. In this case, a keyword extension algorithm at 212 may receive the video name, such as a title for the video, and generate keyword extensions based on the video name. These may be input into the show-related keywords at 206. For example, the keyword extension may add the main character's name, character name #1. In this case, the video-related keywords include a video title and the character name for the video.

Figure 3A:
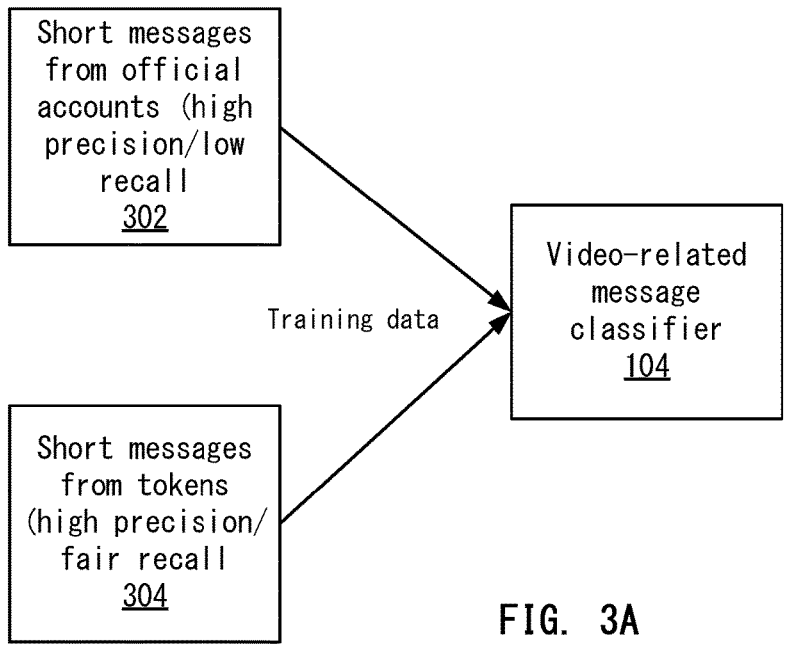
FIG. 3A shows a more detailed example of training video-related message classifier according to one embodiment.

FIG. 3A shows a more detailed example of training video-related message classifier 204 according to one embodiment. The training of video-related message classifier 204 may take as input training data that may be a subset of short messages that may be of higher precision. That is, the training data may be more likely to be related to the video. In one example, the training data may include high precision, low recall short messages and high precision, fair recall short messages. The short messages from search results that need to be classified may include fair precision, high recall short messages. Both the precision and recall are based on relevance. Precision may be the fraction of retrieved instances that are relevant while recall may be the fraction of relevant instances that are retrieved. Also, precision may be how useful the short messages are and recall may be how complete the messages are. High precision may be that the algorithm returns substantially more relevant results than irrelevant, and high recall may be where the algorithm returned most of the relevant results.

In one embodiment, the high precision, low recall messages may be short messages from official accounts related to the video. For example, short message classification framework 102 may identify video-related accounts, which may include the official account for the video, accounts of fans, and other related accounts (e.g., actors accounts, writers accounts, directors accounts, etc.). The official account of the video may be a verified account on the short message source that generates short messages for the video. The accounts of fans, actors, etc. may be individual accounts that may generate short messages about the video (and about other subjects). The video-related accounts may include short messages that are highly relevant to the video. However, there may not be a large amount of short messages from these accounts and thus the show-related accounts may have low recall.

The short messages with high precision and fair recall may include certain short message sources may include tokens, such as hashtags, that can be used to identify that the short message content is related to the video. For example, #video_name may be used to identify short messages related to the video because the "#" token is used to identify the name of the video. These messages may be highly relevant to the video and also include a large amount of relevant short messages. The show-related account short messages and the show-related token short messages may be used as training data to video-related message classifier 204.

Referring back to FIG. 2, at 214, short message classification framework 102 performs a user search via a search interface, such as an API provided by the short message source. Short message classification framework 102 receives search results from the search that include a list of accounts (and maybe other short messages). Not all of these accounts may be related to the video, however. Then, at 216, short message classification framework 102 uses a video-related account classifier to classify the results of the search to generate video-related accounts. The video-related accounts may be accounts that could include relevant short messages for the video.

Figure 4:
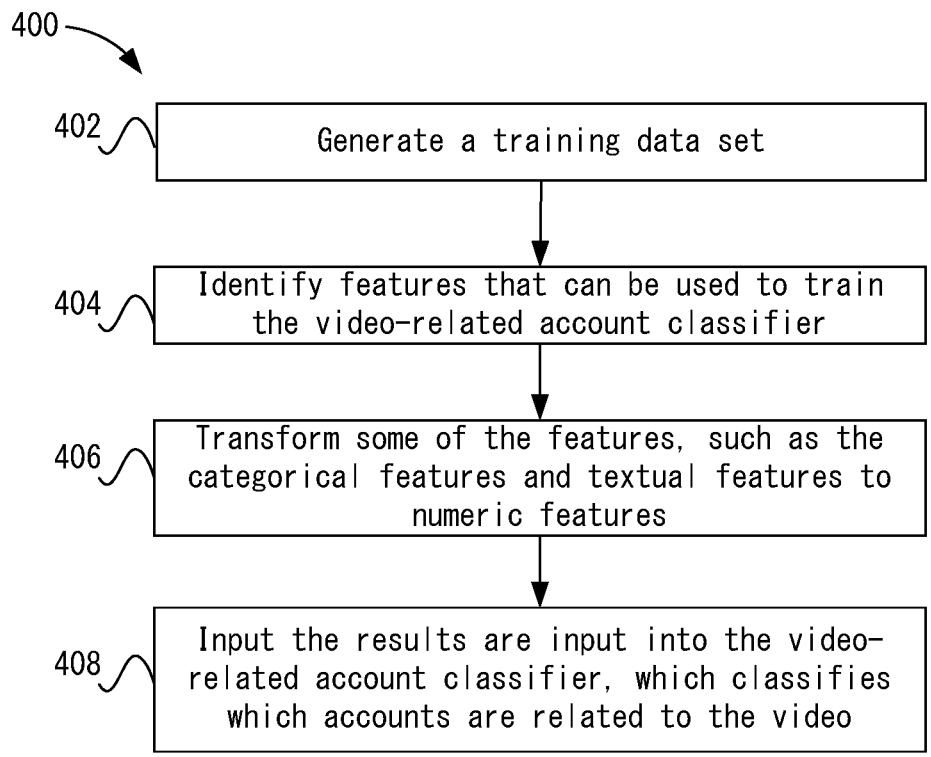
FIG. 4 depicts a simplified flowchart for labeling show-related accounts according to one embodiment.

To determine video-related accounts, short message classification framework 102 may use an automatic labeling method using the video-related account classifier. FIG. 4 depicts a simplified flowchart 400 for labeling show-related accounts according to one embodiment. The automatic labeling may be more efficient than manually searching for video-related accounts. The manual searching may include human interaction and also include a human to verify the results. Accordingly, particular embodiments may train the video-related account classifier to identify video-related accounts.

At 402, short-message match framework 102 generates a training data set. For example, the search for users may be performed automatically via a user search API and/or query suggestions for the video using a search tool. The user search may specifically search for user accounts using keywords, such as the video's title. Also, the query suggestion may suggest possible accounts and query suggestions based on the video's title. With these two results combined, a number of users are found. In one embodiment, a crawler may be used to generate the training data.

Given the two results from above, short-message match framework 102 identifies video-related accounts from the two results. For example, at 404, short-message match framework 102 identifies features that can be used to train the video-related account classifier. The features can include the results from queries to the short message service, a message counts, follower counts, friend counts, favorites counts, list counts, and other features. These features may be numeric, categorical, and textual. Numeric features may be a number, such as a number of short messages sent, categorical may be if the account matches some category, and textual is where the feature includes text.

Given that three types of features are used, classification is performed using a single feature, such as only numeric features in one embodiment. At 406, short-message match framework 102 transforms some of the features, such as the categorical features and textual features to numeric features.

At 408, the results are input into the video-related account classifier, which classifies which accounts are related to the video.

Referring back to FIG. 2, after identifying the video-related accounts, at 220 short-message match framework 102 may identify video-related tokens. The tokens may be words or phrases that may be prefixed with a token, such as "#". For example "#video_name" may be an official token for a TV show that is called "video_name". The tokens may be used in short messages in the accounts, posters for the accounts, or in titles for the accounts. To find the video-related tokens, these tokens usually dominate over other tokens. For example, these tokens may be used in more frequency than other tokens.

In one embodiment, short message classification framework 102 may use a rule-based identification process to identify the tokens. The video-related tokens may be tokens (e.g., #video_name) that may help identify relevant short messages when the messages include the video-related token. Short message classification framework 102 may compare the frequency percentage of occurrence of a token that is computed from the short messages to determine if it is a token that is related to a video. Short message classification framework 102 considers a token a video-related token if its frequency percentage is greater than a threshold, such as 5%, among tokens related to a video. First, the tokens for a video are determined. For example, the video-related accounts may include a number of tokens. Other sources may also include tokens for the video, such as posters and other short messages. Then, short message classification framework 102 takes the token that is used with the highest percentage as a video-related token. Alternatively, short message classification framework 102 may use any tokens that have a frequency of use over a threshold. This generates video-related tokens.

Negative short messages, that is, show-irrelevant short messages, may also be used to make the classification more robust. However, to identify the negative short messages manually might be too inefficient. In one embodiment, short message classification framework 102 may use a small percentage, such as 1%, of sample short messages from the whole stream as negative short messages.

In this case, in FIG. 3A, positive short messages from video-related accounts at 302 and video-related tokens at 304 are provided in addition to negative short messages, which may be 1% sampling of the whole short message stream, are provided to video-related classifier 204.

When performing the classifying, short message classification framework 102 may extract different types of features. For example, short message classification framework 102 extracts three types of features as words as a sparse feature vector, tokens as a sparse features vector and mentions as a sparse feature vector.

For the words as a sparse feature vector, short messages may contain keywords such as the words "watching" and "[video name]". The term "[video name]" is the name of the video. In one example, the short message may be "I could never get tired of watching [video name]." These words can be used to identify whether a short message is discussing a video. In one example, a word dictionary may include [I, could, never, get, tired, of, watching, show name, other1, other2], length=11. This dictionary includes words that are considered relevant. During the training phrase, video-related classifier 204 learns the weight (alpha) for each word. Words like watch, TV, show may have higher weights than other common words. That is to say, a sentence contains highly weighted words such as 'watch' have higher probability of being related. The words "other1" and "other2" represent other words. The feature vector for the short message above is (1, 1, 1, 1, 1, 1, 1, 1, 1, 0, 0). The "1" values in the feature vector indicate that the corresponding word in the dictionary is found in the short message. The words "I could never get tired of watching [show name] are all found in the short message and include the value of "1" in the feature vector. The "0" values in the feature vector indicate that the words "other1" and "other2" were not found in the short message.

For the tokens as a sparse feature vector, tokens such as #video_name can be used to infer relevance. For example, the account may state: "don't forget! Catch up on # video_name 1 season 12 now! Unlocked episodes are here at this link." If the token dictionary is [#video_name 1, #video_name 2] (length=2), then the feature vector for the short message above is (1, 0). This indicates that video_name 1 has been found but not video_name 2. Due to the short message containing video_name 1, this message may be more relevant to the video.

For the mentions as a sparse features vector, when a short message mentions some related entity, such as actors, it is very likely that it may be relevant to that actor's show. For example, when a mention of "@ actor_name takes a break from @video_name", then it may be assumed that this is mentioning the actor (the actor by the name of actor_name) for the show. If the mention dictionary is [@ actor_name, @video_name, @somebodyelse], then the feature vector for the short message above is [1, 1, 0]. This indicates that this short message may be relevant to the show.

Figure 3B:
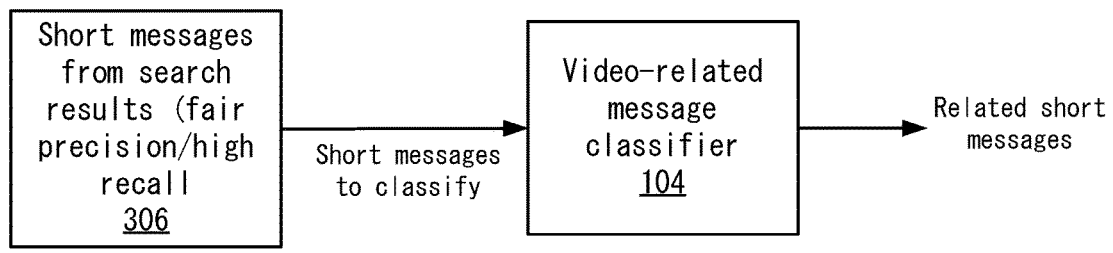
FIG. 3B shows an example of video-related message classifier when performing the classification according to one embodiment.

Once the training is complete, short message classification framework 102 can classify noisy short messages. FIG. 3B shows an example of video-related message classifier 204 when performing the classification according to one embodiment. At 306, short messages generated from the search results are input into video-related message classifier 104. Related short messages are then classified and output. Related short messages are then classified and output. For example, video-related classifier 204 uses the following to perform the classification: if sigmoid(alpha1*feature[1]+alpha2*feature[2]+ . . . +alpha_k*feature[k])>0.5, then the short message is assumed to be show related. The output of the classifier may be between 0 and 1. Alpha is the learned weight for the word, and feature is the word in the sentence.

0.5 may be used as a threshold, but other thresholds may be used. If the output is above 0.5, then it is assumed, the sentence included words that are relevant to the video. Else, video-related message classifier 204 outputs that it is not related.

Figure 5:
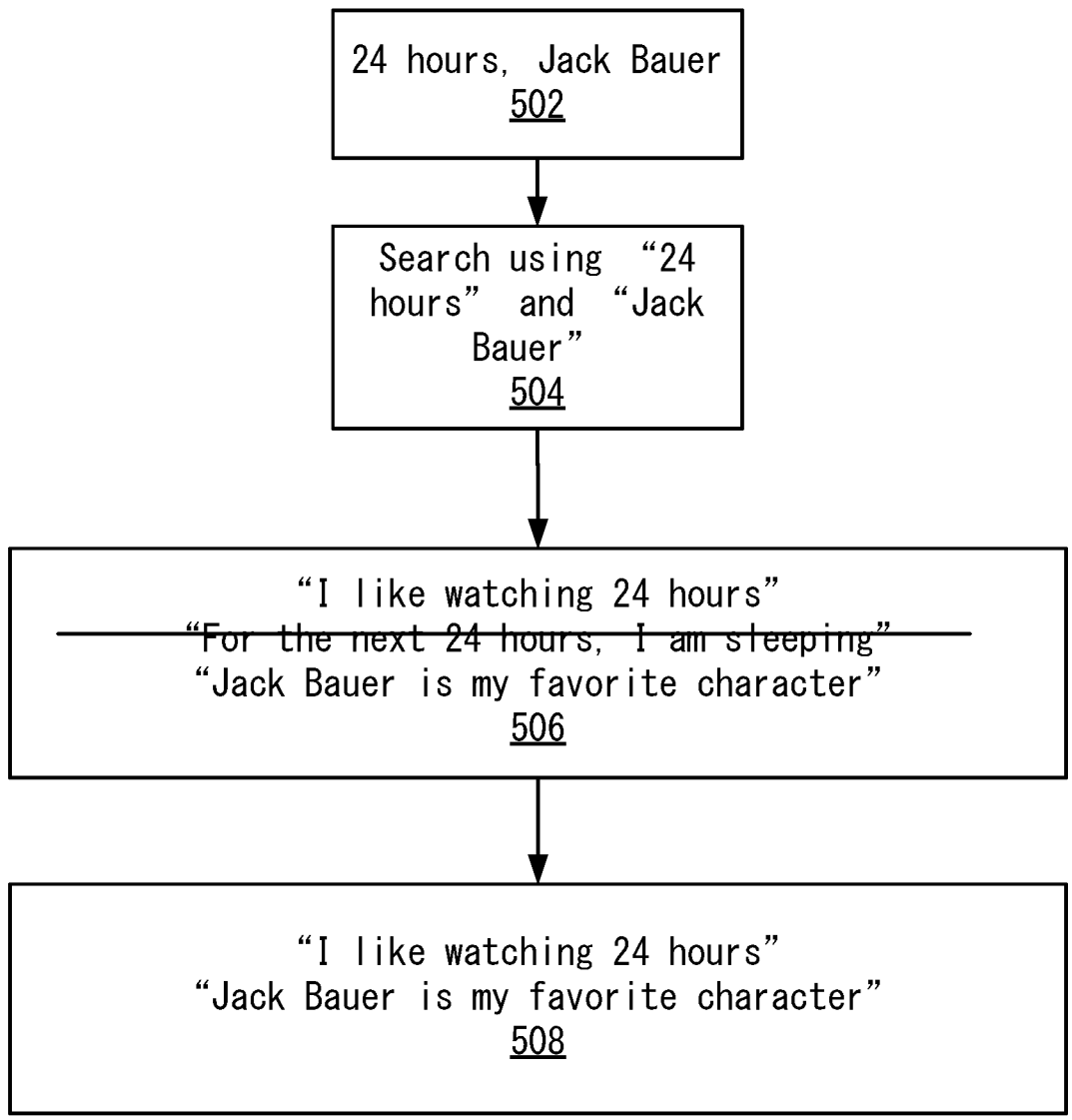
FIG. 5 shows an example that analyzes short messages to classify the messages according to one embodiment.

FIG. 5 shows an example 500 that analyzes short messages to classify the messages according to one embodiment. At 502, the keywords used are "[video name]" and "[actor name]". The video name may be the title of the video, such as "24 hours". Keyword extension may generate the actor's name who stars in the video, such as "Jack Bauer".

At 504, short message classification framework 102 searches using the video name and the actor name. At 506, this retrieves 3 short messages. In one example, the three short messages may be "I like watching 24 Hours", "For the next 24 hours, I am sleeping", and "[Actor name] is my favorite Character." In this case, video-related short message classifier 204 can determine the second short message is not related to the video. The above training may recognize the phrase "For the next 24 hours" in the second short message is not talking about the video. This may be because the words of the short message have lower weights from words from other short messages that were retrieved from video-related accounts or video-related tokens. For example, the word "watch" has a higher weight than the words "For the next".

At 508, short message classification framework 102 outputs the first message and the third message as short messages that are related to the video.

After training of video-related short message classifier 204, short message classification framework 102 can evaluate the performance of the classifier using domain knowledge. For example, short message classification framework 102 may select the top X videos on the video delivery service. Then, short message classification framework 102 may select a number of current videos being offered by other services. Some of these current videos may overlap with the top X videos on the video delivery service. A video list is generated that includes the unique videos from the top X videos and current videos.

For each video, short message classification framework 102 selects that top Y results for a user search and query suggestions. This yields Z records for all of the video list. Short message classification framework 102 then inputs the Z short messages into video-related short message classifier 204 to generate video-related short messages. The results may be compared to manually generated results that classify the Z short messages according to if the account for a short message is totally relevant (e.g., official accounts, fan accounts), partially relevant (e.g., actors, directors), or totally irrelevant.

Accordingly, the training of the video-related short message classifier with domain knowledge about videos for a video delivery service is used to identify related short messages to the videos offered by the video delivery service. The training allows the video-related short message classifier to find short messages that are more related to the videos of the video delivery service.

Short Message Normalization Framework

The short messages that are related to the videos of the video delivery service may include different instances of text that could be normalized. The text includes emoticons (e.g., emotional symbols), short message service tokens, and transformation words. The emoticons may introduce an expressive, non-verbal component into the written language mirroring the role played by facial expressions in speech. Short message tokens may include special tokens that are used to express some entity. These may include the hashtag "#", "@", a URL link, and other symbols. An example for the hashtag include "#show_name", and an example for the @ include "@person_name", where show_name is a title of a show and person_name may be name of a person, such as an actor. There are also non-standard tokens that can be processed by a unified letter transformation approach. These include phrase abbreviations (e.g., lol, lmao), word abbreviations (e.g., tgthr, weeknd), letter repetition (e.g., gooood, sooooo), stylistic variations (e.g., betta, hubbie), typographic errors (e.g., thimg, singimg), phonetic substitutions (e.g., ur, y, c), digit substitutions (e.g., 4ever, 5top), graphemic substitutions (e.g., doinq), and any combinations of the above (e.g., luvving, 2moro). These examples may be generally referred to out-of-vocabulary (OOV) words or non-standard words.

Users may be accustomed to the out-of-vocabulary words described above to express their opinion. However, when analyzing the short messages to rate them for the video delivery service, the out-of-vocabulary words may cause inaccuracies in the ratings. Accordingly, particular embodiments transform out-of-vocabulary words to in-vocabulary words to increase the accuracy of the ratings for the short messages. Due to the many variations of out-of-vocabulary words, the normalization may be difficult. To address this problem, short message normalization framework 104 may use a mixed model. This provides a hybrid normalization model that can automatically generate a lexicon model. Then, the lexicon model is used in generating a translation model.

Figure 6:
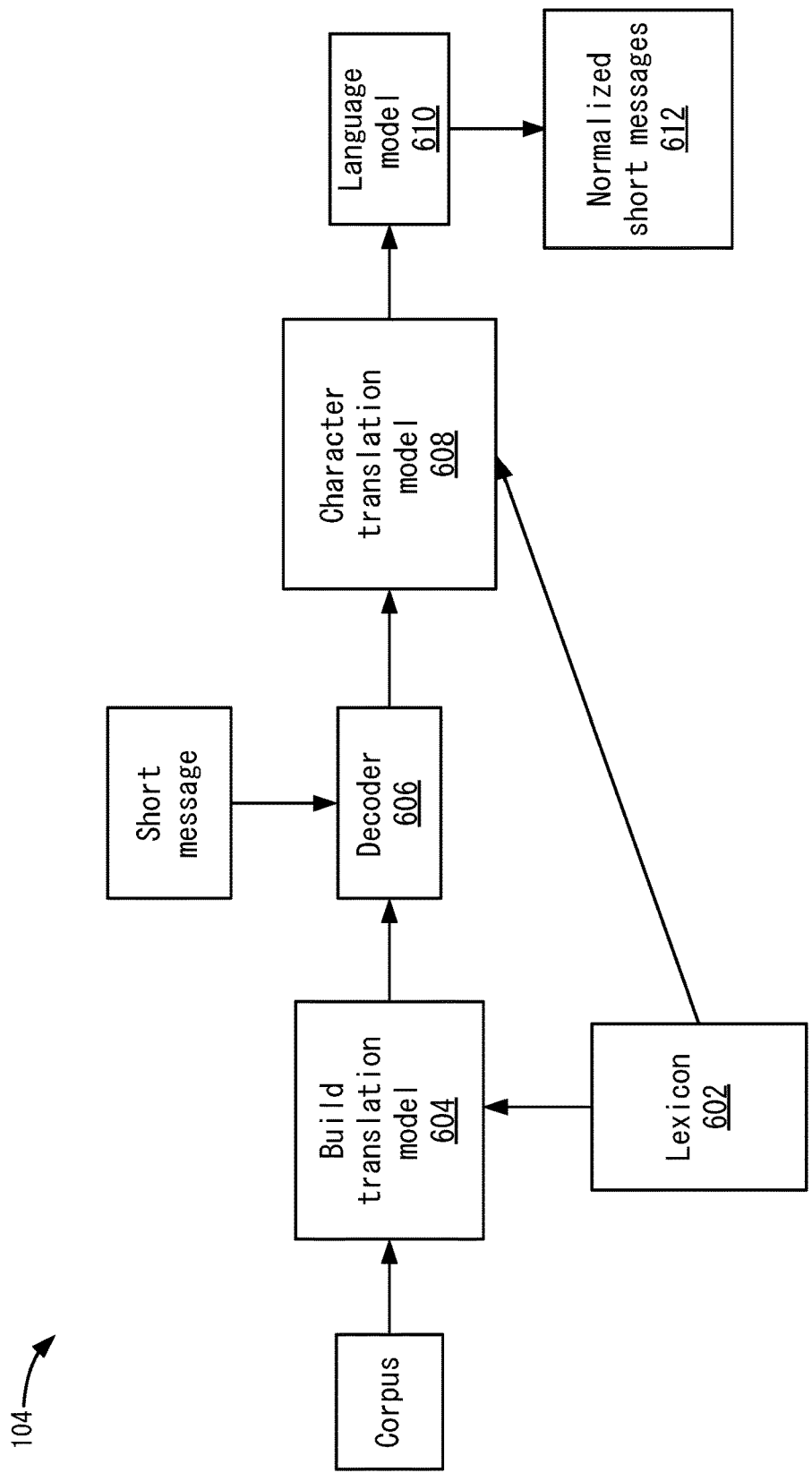
FIG. 6 depicts a more detailed example of short message normalization framework according to one embodiment.

FIG. 6 depicts a more detailed example of short message normalization framework 104 according to one embodiment. At 602, short message normalization framework 104 builds a lexicon that is used in the normalization process. To build the normalization lexicon, a method that takes into account characteristics of the video delivery service is needed. Short message normalization framework 104 also builds a translation model at 604 that uses a decoder at 606 to translate text of the short messages. A character translation model 608 is further used to translate "invisible" words that cannot be translated by the translation model. A language model at 610 is then used to select the most suitable candidate for the text of the short message.

The normalization lexicon will be described in more detail first and then the translation model. Short message normalization framework 104 performs a pre-processing step to build the lexicon. In one embodiment, in the pre-processing flow, irrelevant characters are removed in a first step. These irrelevant characters may include emoji emoticons and non-English tokens that can be filtered out. This may improve the processing going forward because these irrelevant characters are not relevant and can affect the lexicon pre-processing.

In a step 2 of the pre-processing, linguistic rules may be used to build the lexicon. The rules include some linguistic rules that can be used for digits, repetition letters, some cursive candidates, and a short-message specific tool to remove short-message specific tokens. For each digit number, short message normalization framework 104 finds several substitutions and explores possible candidates to identify the in-vocabulary words. For different numbers, the substitution options may be different. For example, for the digit "0", the substitutions may be "zero" or "the number 0". For the digit "2", the substitutions may be "2", "two", "too", and "to". Other rules may also be appreciated.

Repetition letters may be letters that are repeated for some purpose, such as to express emotion for a word. For example, some users may use 'gooood' in short messages to express their emotion, so the repetition letters is 'oooo' here. The regular expressions are used to remove the redundant letters, when applying the regular expressions in these out-of-vocabulary word, such as 'gooood', this word can be converted to 'good' or 'god'.

Also, in the pre-processing, short message normalization framework 104 enumerates possible candidates recursively. For example, for "be4", the candidates are "befour", "befor", and "before". "Before" is an in-vocabulary word so short message normalization framework 104 adds (be4, [before]) to the lexicon directly. For the word "goooood", the candidates are "goooood", "goood", "good", "god." "Good" and "god" are in-vocabulary words, so short message normalization framework 104 adds "(goooood,[good, god])". For the word "weeellll", the candidates are "weelll, wellll, welll, well, wel, weeelll, weeell, weeel, weel, and wel". Regular expressions may be used to find the in-vocabulary word. For example, a regular expression will convert 'weeelll' to 'weell' (two 'e' and two 'l'), and the other regular expressions will convert 'weell' to 'well' (one 'e' and two 'l') and 'weel'(two 'e' and one 'l'); since 'well' is a valid word, short message classification framework 102 adds the pair <weeellll, well> into the lexicon. For the word "follloing", the candidates are "folloing, foolooing" using regular expressions to remove repeating letters. There are not any in-vocabulary words in the candidate set and nothing may be added.]

Then, for short-message source specific short messages, short message normalization framework 104 may use a tool to remove short-message specific tokens, such as emoticon tokens, "@" symbols, uniform resource locators, and so on. The tool may also be used to tag part of speech for each short message. The part of speech may help extract suitable out-of-vocabulary word candidates and select a more suitable standard word. Part of speech tagging may be where a word is assigned a category in accordance with syntactic functions. This may be the main parts of speech, such as noun, pronoun, adjective, determiner, verb, adverb, preposition, conjunction, and interjection.

Figure 7:
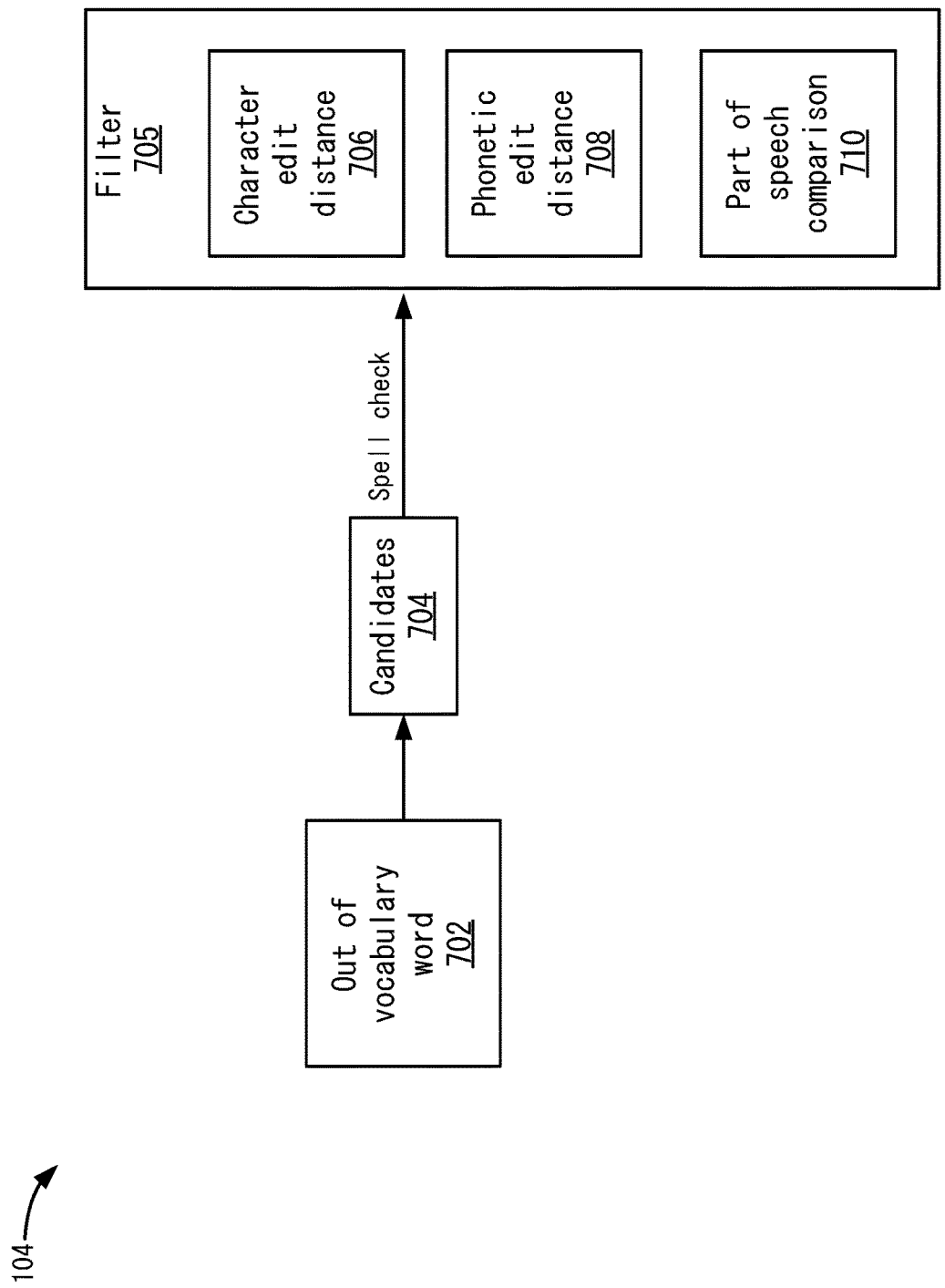
FIG. 7 shows a normalization lexicon framework for building the lexicon according to one embodiment.

After pre-processing, short message normalization framework 104 builds the lexicon. FIG. 7 shows a normalization lexicon framework for building the lexicon according to one embodiment. At 702, an out-of-vocabulary word is received. To generate the lexicon, short message normalization framework 104 needs to determine which out-of-vocabulary words need to be normalized. It may not make sense to normalize every out-of-vocabulary word because not all of the out-of-vocabulary words can be normalized to find their correct format. For an out-of-vocabulary word, if its term frequency is relatively lower, short message normalization framework 104 may indicate that this word is less likely to be normalized. Term frequency may measure how frequently a term occurs in a document. The part of speech is also important because if the out-of-vocabulary word is a proper noun, it might not need to be normalized. However, if the out-of-vocabulary word is an abbreviation word, the lexicon methods may not be able to find its true format. Thus, the abbreviation word may not be normalized.

At 704, short message normalization framework 104 generates candidates. In one embodiment, short message normalization framework 104 may use context aware methods. For example, word embeddings may be used where if a word A has a similar local window (context) with a word B, then a distance, such as a cosine distance, between word embeddings of A and B will be more close. Based on the pre-processing, short message normalization framework 104 can run the word embeddings model on short messages and obtain word embeddings of all the words. This generates out-of-vocabulary word candidates for the out-of-vocabulary word.

After selecting the out-of-vocabulary word candidates, short message normalization framework 104 can determine the top N candidates according to the distance. For example, the top 5 candidates that are closest in distance are selected. Then, a spellchecker is used to filter out-of-vocabulary words from the top N candidates. This removes words that are not proper words. Finally, a filter 705 is used to filter the suitable candidates into a set Si. For example, at 706, 708, and 710, the phonetic edit distance, string edit distance, and part of speech, respectively, are used to filter the suitable candidates set Si. The phonetic edit distance is based on the pronunciation of the words, the string edit distance is how similar the two strings are, and the part of speech is used to determine if the two words are the same part of speech or not. For a word wi, the lexicon (wi, Si) is added to the normalization lexicon. It is noted that the size of Si can be bigger than 1 and can also equal 0.

Figure 8:
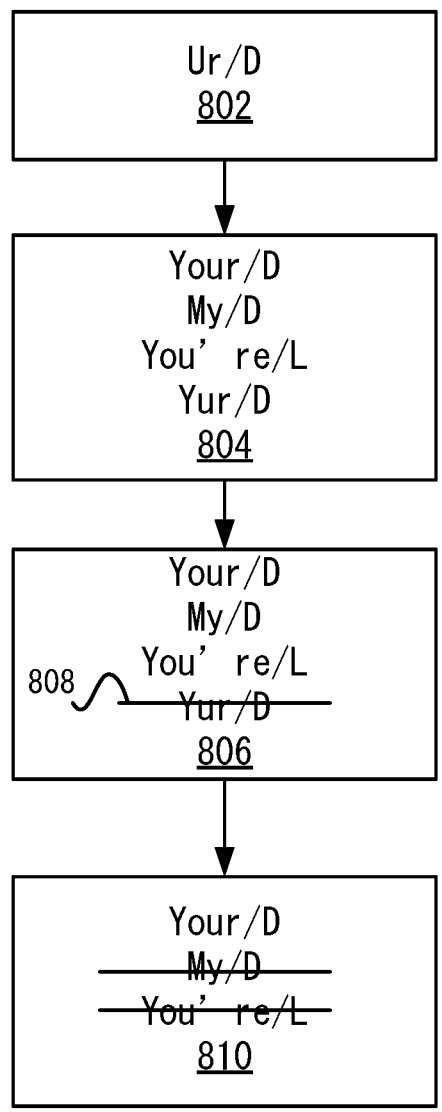
FIG. 8 shows an example of using the lexicon building process according to one embodiment.

FIG. 8 shows an example of using the lexicon building process according to one embodiment. At 802, the current out-of-vocabulary word is "ur/D". At 804, the candidate set Si is found based on the cosine distance of word embeddings. The top four words are "your/D", "my/D", "you're/L", and "yur/D". The part of speech tagging may be based on different identifiers. For example, /D is a determiner, /L is a nominal and a verbal part of speech. Other parts of speech may also be used.

At 806, short-message normalization framework 104 filters the candidate set using a spellchecker, which removes the word "yur/D" at 808 from the candidate set due to the word not having a correct spelling. Next, at 810, the word "you're/L" is removed because its part of speech is different from the word "ur/D". Also, the word "my/D" can be removed because the edit distance is greater than a threshold. Finally, the pair "ur", "your" is added to the lexicon (with the part of speech information removed).

Now that the lexicon has been built, referring back to FIG. 6, at 604, short message normalization framework 104 builds a translation model. To build the translation model, a corpus needs to be built. The corpus includes the collection of short messages from one or more short message services. Short message normalization framework 104 builds the translation model based on the lexicon and the corpus. The lexicon is used to train a character-based translation model and incorporate the prior information from the lexicon into sentence-based translation model. For example, in sentence-based translation model, the probability p(lovelluv)=0, p(lovelluvv)=0. It means the translation model cannot find the correct alignment. After short message normalization framework 104 incorporates a piece of prior knowledge from the lexicon, luv->love, then the model can calculate that p(lovelluv)=1, p(lovelluvv)=1. As can be seen, not only luv, the prior knowledge also can help luvv to find its correct alignment.

One problem with the corpus may be with parallel short messages that may occur. A parallel short message may be where a user may generate a short message in one language, and then, another user may resend short message normalization framework 104 that short message in another language. The problem is to extract the parallel segments of the messages that correspond.

The translation model may be a mixed translation model. The lexicon can be regarded as prior knowledge for an alignment function. The alignment function may align the words of a short message with the translation. For example, there are several parallel sentences, such as:

luv u 4ever→love you forever; and
luvv this film→love this film.

As discussed above, the probability p(love|luv)=0, p(love|luvv)=0. This means that the translation model cannot find the correct alignment. After short message normalization framework 104 incorporates prior knowledge from the lexicon that luv→love, then the model can calculate that the probability p(love|luv)=1, p(love|luvv)=1. That is, not only the word luv can be translated, prior knowledge can also help translate luvv to find the correct alignment. The word luvv can be calculated due to the same translation of love to luv and love to luvv.

Figure 9:
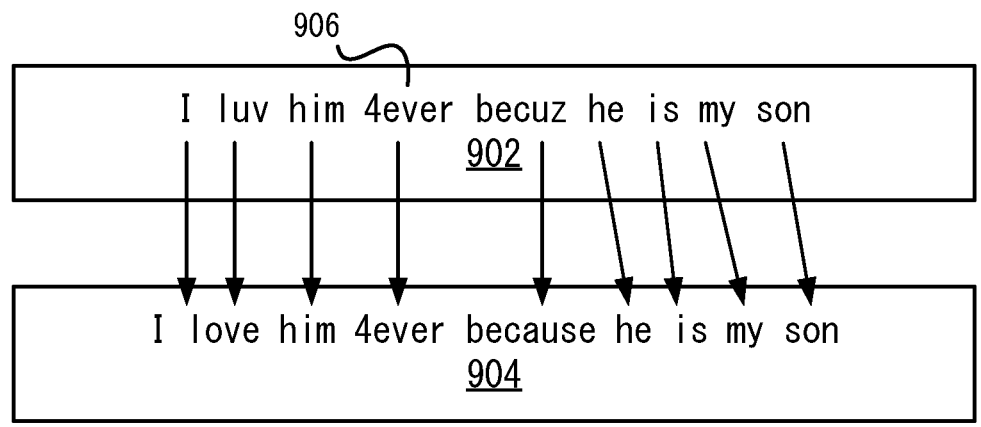
FIG. 9 shows the translation according to one embodiment.

After training the alignment function for the translation model, the alignment function contains words and phrases and can use a decoder at 606 to translate new text. The decoder at 606 receives a short message as input in addition to the translation model. In one example, if the original text is "I luv him 4ever becuz he is my son", the decoder translates the sentence to "I love him 4ever because he is my son". The word "4ever" is an unseen or invisible word so the decoder does not translate it. An unseen word may be a word that cannot be translated by the translation model. FIG. 9 shows the translation according to one embodiment. At 902, the original text is shown, and at 904, the translated text is shown. As seen, each word may be translated except for the word "4ever", which is an unseen word at 906. The translation model translates words to words. The word "4ever" cannot be translated into a single word because there may be multiple options for the word, such as "forever" and "fever".

Figure 10:
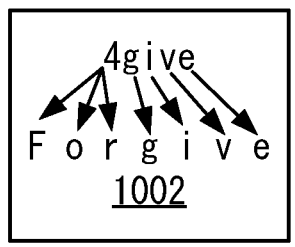
FIG. 10 shows an example using a character-based translation model according to one embodiment.
Figure 10:
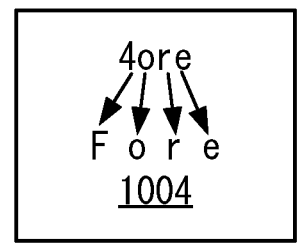

Referring back to FIG. 6 to translate the unseen word, short message normalization framework 104 may use a character translation model at 608 that uses prior knowledge from the lexicon. This prior knowledge is used similarly as was described with respect to the word translation model at 604. Short message normalization framework 104 uses the character translation model to learn the normalization rules based on the normalization lexicon. For example, there may be two pairs of words (4give, forgive) and (4ore, fore). Short message normalization framework 104 may use a character-based translation model to get an alignment. For example, FIG. 10 shows an example using a character-based translation model according to one embodiment. At 1002, the word "4give" is translated character by character to "forgive", and at 1004, the word "4ore" is translated character by character to "fore".

Figure 11:
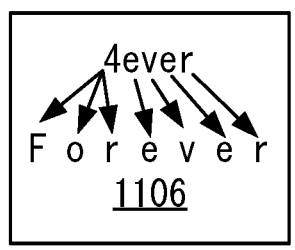
FIG. 11 shows an example of the character-based translation of the word "4ever" according to one embodiment.
Figure 11:
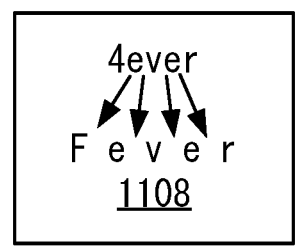

Short message normalization framework 104 can translate the word "4ever" based on the alignments in FIG. 10. FIG. 11 shows an example of the character-based translation of the word "4ever" according to one embodiment. At 1106, the word "4ever" is translated character-by-character into the word "forever". Also, at 1108, the word "4ever" is translated into the word "fever". This translation used the two character translations from FIG. 10 of "4" to "for" and "4" to "f". Thus, using the character-based translation model for another pair, short message normalization framework 104 can translate the unseen word "4ever" into two possibilities.

Using the character-based translation model, short message normalization framework 104 can normalize the word "4ever" to "forever" or "fever". Then, short message normalization framework 104 can decide which candidate to select for the current translation for the unseen word in the short message. Referring to FIG. 6, short message normalization framework 104 uses a language model at 610 to select the highest probability candidate. In one embodiment, the language model calculates the probability for the following sentences:

Probability p (Si)=p (I love him forever because he is my son.)
P(Sii)=p (I love him fever because he is my son.)

According to the language model, short message normalization framework 104 obtains the following probability of p(Si)>p(Sii). Therefore, short message normalization framework 104 selects the sentence Si (I love him forever because he is my son.) as the formal text using the language model. Thus, short message normalization framework 104 outputs the short message at 612. Accordingly, particular embodiments learn rules that handle visible words. Short message normalization framework 104 can generate multiple candidates and select a suitable one according to context. Further, the process translates the abbreviated words and can use part of speech information to select the proper out-of-vocabulary word to normalize it. Additionally, short message normalization framework 104 can normalize visible words and select suitable candidates. This method can use prior knowledge to perform the translation.

Short Message Rating System

After determining which short messages are related and then normalizing the text, sentiment analysis framework 106 may generate ratings for the short messages. The ratings may determine whether or not a show should be highlighted on a user interface for the video delivery service. The ratings may also be used in a business analysis tool.

Sentiment analysis framework 106 can analyze text of the short messages to rate the sentiment. The sentiment may be based on whether the short message has positive content or negative content. Further, a number of short messages about a show may also indicate that there is a buzz about the show, whether positive or negative, and this show may be rated higher. The ratings can determine the context of the short messages, such as if the content of the short message is positive, which may indicate the video is trending popular, or negative, which may indicate the video is trending unpopular. By normalizing the text of the messages, sentiment analysis framework 106 can perform the analysis more accurately. In some cases, the algorithm used by sentiment analysis framework 106 can only be used where in-vocabulary words are used or over a threshold of a percentage of total words in the short messages. For example, the short messages from a short message service may contain a large amount of out of vocabulary words and sentiment analysis cannot be performed on these messages as is without conversion.

To confirm the sentiment analysis, short message classification framework 102 may use domain knowledge. For example, the popular videos on the video delivery service may be used as input to the classifier. Then, short message classification framework 102 compares popularity from the video delivery service with the classifier's performance using the popular videos from the video delivery service. If the popularities differ significantly, that may mean the classifier may have mistakenly included some keyword derived from one of the videos. Short message classification framework 102 may then analyze the popular videos to determine which video is causing the noise and remove the noisy video. Video-related short message classifier 204 can then be re-trained.

Video Delivery Services

Once the ratings of the short messages is determined and aggregated, video services system 108 may perform services using the ratings. For example, popular videos may be recommended to users. Further, user interfaces, such as interfaces that include a trending tray, may include the trending videos that have high ratings.

System Overview

Figure 12:
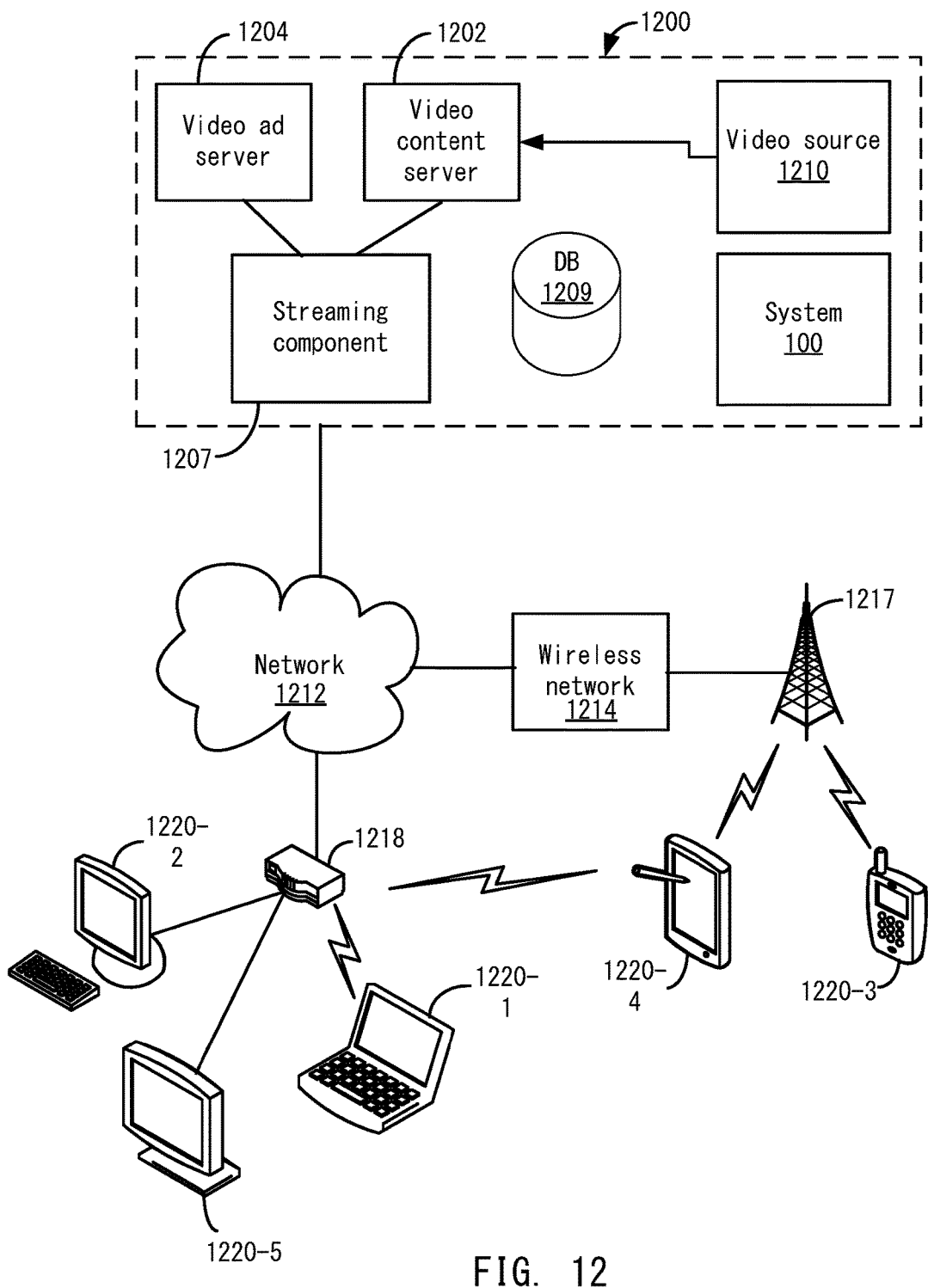
FIG. 12 depicts a video streaming system in communication with multiple client devices via one or more communication networks according to one embodiment.

Features and aspects as disclosed herein may be implemented in conjunction with a video streaming system 1200 in communication with multiple client devices via one or more communication networks as shown in FIG. 12. Aspects of the video streaming system 1200 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 1200, video data may be obtained from one or more sources for example, from a video source 1210, for use as input to a video content server 1202. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1200 may include one or more computer servers or modules 1202, 1204, and/or 1207 distributed over one or more computers. Each server 1202, 1204, 1207 may include, or may be operatively coupled to, one or more data stores 1209, for example databases, indexes, files, or other data structures. A video content server 1202 may access a data store (not shown) of various video segments. The video content server 1202 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1204 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1200, a public service message, or some other information. The video advertising server 1204 may serve the video advertising segments as directed by a user interface controller (not shown).

The video streaming system 1200 also may include system 100.

The video streaming system 1200 may further include an integration and streaming component 1207 that integrates video content and video advertising into a streaming video segment. For example, streaming component 1207 may be a content server or streaming media server. A controller (not shown) may determine the selection or configuration of advertising in the streaming video based on any suitable algorithm or process. The video streaming system 1200 may include other modules or units not depicted in FIG. 12, for example administrative servers, commerce servers, network infrastructure, advertising selection engines, and so forth.

The video streaming system 1200 may connect to a data communication network 1212. A data communication network 1212 may comprise a local area network (LAN), a wide area network (WAN), for example, the Internet, a telephone network, a wireless cellular telecommunications network (WCS) 1214, or some combination of these or similar networks.

One or more client devices 1220 may be in communication with the video streaming system 1200, via the data communication network 1212 and/or other network 1214. Such client devices may include, for example, one or more laptop computers 1220-1, desktop computers 1220-2, "smart" mobile phones 1220-3, tablet devices 1220-4, network-enabled televisions 1220-5, or combinations thereof, via a router 1218 for a LAN, via a base station 1217 for a wireless telephony network 1214, or via some other connection. In operation, such client devices 1220 may send and receive data or instructions to the system 1200, in response to user input received from user input devices or other input. In response, the system 1200 may serve video segments and metadata from the data store 1209 responsive to selection of media programs to the client devices 1220. Client devices 1220 may output the video content from the streaming video segment in a media player using a display screen, projector, or other video output device, and receive user input for interacting with the video content.

Distribution of audio-video data may be implemented from streaming component 1207 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1207 may communicate with client device 1220 using control messages and data messages to adjust to changing network conditions as the video is played. These control messages can include commands for enabling control functions such as fast forward, fast reverse, pausing, or seeking to a particular part of the file at the client.

Since streaming component 1207 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1207 may use TCP-based protocols, such as HTTP and Real Time Messaging Protocol (RTMP). Streaming component 1207 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 13:
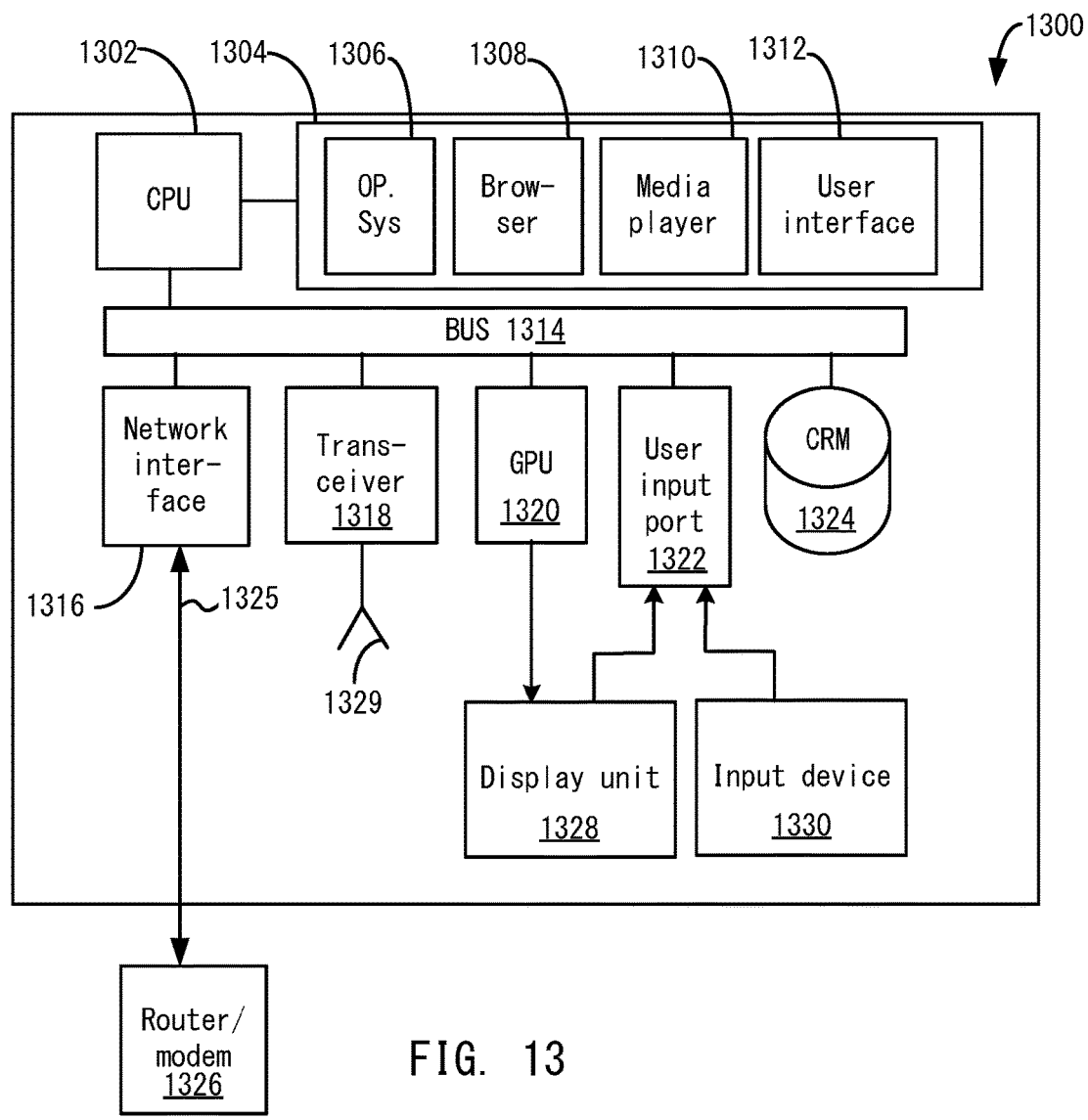
FIG. 13 depicts a diagrammatic view of an apparatus for viewing video content and advertisements.

Referring to FIG. 13, a diagrammatic view of an apparatus 1300 for viewing video content and advertisements is illustrated. In selected embodiments, the apparatus 1300 may include a processor (CPU) 1302 operatively coupled to a processor memory 1304, which holds binary-coded functional modules for execution by the processor 1302. Such functional modules may include an operating system 1306 for handling system functions such as input/output and memory access, a browser 1308 to display web pages, and media player 1310 for playing video. The modules may further include a user interface 1312 including videos determined based on the sentiment analysis. The memory 1304 may hold additional modules not shown in FIG. 13, for example modules for performing other operations described elsewhere herein.

A bus 1314 or other communication component may support communication of information within the apparatus 1300. The processor 1302 may be a specialized or dedicated microprocessor configured to perform particular tasks in accordance with the features and aspects disclosed herein by executing machine-readable software code defining the particular tasks. Processor memory 1304 (e.g., random access memory (RAM) or other dynamic storage device) may be connected to the bus 1314 or directly to the processor 1302, and store information and instructions to be executed by a processor 1302. The memory 1304 may also store temporary variables or other intermediate information during execution of such instructions.

A computer-readable medium in a storage device 1324 may be connected to the bus 1314 and store static information and instructions for the processor 1302; for example, the storage device (CRM) 1324 may store the modules 1306, 1308, 1310 and 1312 when the apparatus 1300 is powered off, from which the modules may be loaded into the processor memory 1304 when the apparatus 1300 is powered up. The storage device 1324 may include a non-transitory computer-readable storage medium holding information, instructions, or some combination thereof, for example instructions that when executed by the processor 1302, cause the apparatus 1300 to be configured to perform one or more operations of a method as described herein.

A communication interface 1316 may also be connected to the bus 1314. The communication interface 1316 may provide or support two-way data communication between the apparatus 1300 and one or more external devices, e.g., the streaming system 1200, optionally via a router/modem 1326 and a wired or wireless connection. In the alternative, or in addition, the apparatus 1300 may include a transceiver 1318 connected to an antenna 1329, through which the apparatus 1300 may communicate wirelessly with a base station for a wireless communication system or with the router/modem 1326. In the alternative, the apparatus 1300 may communicate with a video streaming system 1200 via a local area network, virtual private network, or other network. In another alternative, the apparatus 1300 may be incorporated as a module or component of the system 1200 and communicate with other components via the bus 1314 or by some other modality.

The apparatus 1300 may be connected (e.g., via the bus 1314 and graphics processing unit 1320) to a display unit 1328. A display 1328 may include any suitable configuration for displaying information to an operator of the apparatus 1300. For example, a display 1328 may include or utilize a liquid crystal display (LCD), touchscreen LCD (e.g., capacitive display), light emitting diode (LED) display, projector, or other display device to present information to a user of the apparatus 1300 in a visual display.

One or more input devices 1330 (e.g., an alphanumeric keyboard, microphone, keypad, remote controller, game controller, camera or camera array) may be connected to the bus 1314 via a user input port 1322 to communicate information and commands to the apparatus 1300. In selected embodiments, an input device 1330 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1328, for example using a touch sensitive screen. A cursor control device may communicate direction information and command selections to the processor 1302 and control cursor movement on the display 1328. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    identifying, by a computing device, a first set short messages that are related to a video using a second set of short messages from a set of accounts related to the video and a third set of short messages including a token that is used to identify the video, wherein at least a portion of the second set of short messages and the third set of short messages have a length restriction;
    identifying, by the computing device, a fourth set of short messages that are related to the video from a plurality of short messages, the plurality of short messages generated from a search for the video;
    normalizing, by the computing device, words in at least one or more of the first set of short messages and the fourth set of short messages using a mixed model including a lexicon model and a translation model, wherein normalizing comprises:
    building, by the computing device, the translation model using a lexicon of out of vocabulary words and corresponding in-vocabulary words and a corpus of words from short messages from a source, wherein the translation model is used to translate out of vocabulary words from the set of short messages to in-vocabulary words;
    inputting, by the computing device, a short message from the at least one or more of the first set of short messages and the fourth set of short messages into a decoder; and
    translating, by the computing device, a set of words from the short message using the translation model at the decoder,
    wherein when a word from the short message cannot be translated using the decoder, performing:
    generating, by the computing device, a character translation model to translate characters based on the lexicon;
    translating, by the computing device, the word that could not be translated by the translation model using the character translation model; and
    generating, by the computing device, a set of ratings for the at least one or more of the first set of short messages and the fourth set of short messages for the video.

2. The method of claim 1, further comprising:
    selecting the set of accounts, wherein selecting the set of accounts comprises:
    generating a training data set of the set of accounts;
    identifying features for the training data set; and
    classifying the set of accounts using features extracted from short messages of the set of accounts.

3. The method of claim 2, wherein selecting the set of accounts further comprises:
    performing a suggested accounts search that provides suggested accounts that are related to the video; and
    identifying accounts related to the video from at least a portion of the suggested accounts.

4. The method of claim 2, wherein selecting the set of accounts further comprises:
    performing a query suggestions search that provides query suggestions for accounts that are related to the video; and
    identifying accounts related to the video from at least a portion of query suggestions for accounts.

5. The method of claim 1, further comprising:
    selecting the token, wherein selecting the token comprises:
    selecting a group of tokens for the video; and
    using a frequency of use to select the token used to identify the video.

6. The method of claim 5, wherein using the frequency comprises:
    comparing the frequency of use for each of the group of tokens to a threshold; and
    selecting the token based on the comparing, wherein the token has a frequency of use that meets the threshold.

7. The method of claim 1, wherein identifying the first set of short messages comprises:
    selecting negative short messages that are not relevant to the video; and
    using the negative short messages to determine the first set of short messages.

8. The method of claim 7, wherein the negative short messages are selected as a sampling of a percentage of a total of short messages generated from the source.

9. The method of claim 1, further comprising:
    using the set of ratings in a service for a video delivery service.

10. The method of claim 1, further comprising:
    selecting the set of accounts related to the video using a first classifier that is trained to identify the set of accounts from a plurality of accounts.

11. The method of claim 10, further comprising:
    training a second classifier to identify the first set of short messages that are related to the video.

12. A non-transitory computer-readable storage medium containing instructions, that when executed, control a computer system to be operable for:
    identifying a first set short messages that are related to a video using a second set of short messages from a set of accounts related to the video and a third set of short messages including a token that is used to identify the video, wherein at least a portion of the second set of short messages and the third set of short messages have a length restriction;

identifying a fourth set of short messages that are related to the video from a plurality of short messages, the plurality of short messages generated from a search for the video;

normalizing words in at least one or more of the first set of short messages and the fourth set of short messages using a mixed model including a lexicon model and a translation model, wherein normalizing comprises:

building the translation model using a lexicon of out of vocabulary words and corresponding in-vocabulary words and a corpus of words from short messages from a source, wherein the translation model is used to translate out of vocabulary words from the set of short messages to in-vocabulary words;

inputting a short message from the at least one or more of the first set of short messages and the fourth set of short messages into a decoder; and translating a set of words from the short message using the translation model at the decoder, wherein when a word from the short message cannot be translated using the decoder, performing:

generating a character translation model to translate characters based on the lexicon;

translating the word that could not be translated by the translation model using the character translation model; and generating a set of ratings for the at least one or more of the first set of short messages and the fourth set of short messages for the video.

13. The non-transitory computer-readable storage medium of claim 12, further operable for:

selecting the set of accounts, wherein selecting the set of accounts comprises:

generating a training data set of the set of accounts;

identifying features for the training data set; and classifying the set of accounts using features extracted from short messages of the set of accounts.

14. The non-transitory computer-readable storage medium of claim 13, wherein selecting the set of accounts further comprises:

performing a suggested accounts search that provides suggested accounts that are related to the video;

identifying accounts related to the video from at least a portion of the suggested accounts;

performing a query suggestions search that provides query suggestions for accounts that are related to the video; and identifying accounts related to the video from at least a portion of query suggestions for accounts.

15. The non-transitory computer-readable storage medium of claim 12, further operable for:

selecting the token, wherein selecting the token comprises:

selecting a group of tokens for the video; and using a frequency of use to select the token used to identify the video.

16. The non-transitory computer-readable storage medium of claim 12, further operable for:

using the set of ratings in a service for a video delivery service.

17. The non-transitory computer-readable storage medium of claim 12, further operable for:

selecting the set of accounts related to the video using a first classifier that is trained to identify the set of accounts from a plurality of accounts.

18. The non-transitory computer-readable storage medium of claim 17, further operable for:

training a second classifier to identify the first set of short messages that are related to the video.

19. The non-transitory computer-readable storage medium of claim 12, wherein identifying the first set of short messages comprises:

selecting negative short messages that are not relevant to the video; and using the negative short messages to determine the first set of short messages.

20. An apparatus comprising:

one or more computer processors; and a non-transitory computer-readable storage medium comprising instructions, that when executed, control the one or more computer processors to be configured for:

identifying a first set short messages that are related to a video using a second set of short messages from a set of accounts related to the video and a third set of short messages including a token that is used to identify the video, wherein at least a portion of the second set of short messages and the third set of short messages have a length restriction;

identifying a fourth set of short messages that are related to the video from a plurality of short messages, the plurality of short messages generated from a search for the video;

normalizing words in at least one or more of the first set of short messages and the fourth set of short messages using a mixed model including a lexicon model and a translation model, wherein normalizing comprises:

building the translation model using a lexicon of out of vocabulary words and corresponding in-vocabulary words and a corpus of words from short messages from the source, wherein the translation model is used to translate out of vocabulary words from the set of short messages to in-vocabulary words;

inputting a short message from the at least one or more of the first set of short messages and the fourth set of short messages into a decoder; and translating a set of words from the short message using the translation model at the decoder, wherein when a word from the short message cannot be translated using the decoder, performing:

generating a character translation model to translate characters based on the lexicon; and translating the word that could not be translated by the translation model using the character translation model; and generating a set of ratings for the at least one or more of the first set of short messages and the fourth set of short messages for the video.

* * * * *